United States Patent
Nakamaru et al.

(10) Patent No.: US 6,925,138 B2
(45) Date of Patent: Aug. 2, 2005

(54) REACTOR CORE AND METHOD FOR OPERATING NUCLEAR REACTOR

(75) Inventors: Mikihide Nakamaru, Fujisawa (JP); Hideaki Heki, Yokohama (JP); Takehiko Saito, Tokyo (JP); Kouji Hiraiwa, Chigasaki (JP); Tadashi Narabayashi, Yokohama (JP); Satoru Oomizu, Yokohama (JP); Tsuyoshi Shimoda, Yokohama (JP); Kenji Arai, Kawasaki (JP); Shinichi Morooka, Tokyo (JP); Seijiro Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 09/978,308

(22) Filed: Oct. 17, 2001

(65) Prior Publication Data

US 2002/0080908 A1 Jun. 27, 2002

(30) Foreign Application Priority Data

Oct. 17, 2000 (JP) .................................... 2000-317168

(51) Int. Cl.$^7$ ............................................ G21C 1/04
(52) U.S. Cl. ...................... 376/347; 376/327; 376/207; 376/171
(58) Field of Search .................. 376/347, 327, 376/207, 419, 428, 435, 236, 237, 333

(56) References Cited

U.S. PATENT DOCUMENTS

| | | | | |
|---|---|---|---|---|
| 3,147,191 A | * | 9/1964 | Crowther | 376/172 |
| 3,385,758 A | * | 5/1968 | Gyorey et al. | 376/237 |
| 3,917,768 A | * | 11/1975 | Abate-Daga et al. | 264/0.5 |
| 3,929,565 A | * | 12/1975 | Fredin et al. | 376/224 |
| 4,285,769 A | * | 8/1981 | Specker et al. | 376/267 |
| 4,483,818 A | * | 11/1984 | Yamashita et al. | 376/435 |
| 4,671,927 A | * | 6/1987 | Alsop | 376/419 |
| 4,871,508 A | * | 10/1989 | Lindner | 376/260 |
| 5,145,635 A | * | 9/1992 | Ishii et al. | 376/173 |
| 5,276,718 A | * | 1/1994 | Ueda | 376/220 |
| 5,359,634 A | * | 10/1994 | Johannesson | 376/428 |
| 5,524,033 A | * | 6/1996 | Hida et al. | 376/419 |
| 5,677,938 A | * | 10/1997 | Gassmann | 376/237 |

* cited by examiner

Primary Examiner—Michael J. Carone
Assistant Examiner—R Palabrica
(74) Attorney, Agent, or Firm—Foley & Lardner LLP

(57) ABSTRACT

The present invention is to provide a reactor core that allows a nuclear plant to continuously operate for a long term period, for example 15 years or longer, without requiring any fuel exchange, reduces the duration and number of maintenance steps involved in regular plant inspections, markedly improves plant availability and economic efficiency, and is effective in terms of nuclear nonproliferation.

A plurality of fuel assemblies 103, themselves obtained by arranging fuel rods 100 and water rods 107 in square lattices, are arranged in a square lattice at a certain pitch. The blades 102a of a cross-shaped (cruciform) control rod 102 in a cross section are inserted into four adjacent spaces formed by four fuel assemblies 100 facing each other. A value of 0.06 cm$^{-1}$ or greater is selected for the ratio (B/S) of the width (B) of each blade on the cruciform control rod 102 and the surface (S) of the fuel lattice defined by the surface area of a square whose side is equal to the pitch between the fuel assemblies 103.

4 Claims, 3 Drawing Sheets

REACTOR CORE AND METHOD FOR OPERATING NUCLEAR REACTOR

BACKGROUND OF THE INVENTION

The present invention relates to a reactor core used in a boiling-water reactor and to a method for operating a nuclear reactor, and more particularly to a reactor core capable of operating in a sustained manner for a long-term period, such as 15 years or longer, without fuel exchange, and to a method for operating a nuclear reactor.

The boiling-water nuclear power plants currently in use on a commercial basis have a maximum plant operating cycle of about 2 years, and at the end of each operating cycle the plants are shut down, the vessel cover of the reactor pressure vessel is opened, and a regular (periodic) inspection and fuel exchange are carried out. In this case, spent fuel is transported to and stored in a spent fuel storage pool disposed on the upper floor (section) of the reactor building, so the reactor well is filled with water pumped from a condensation storage tank or pressure suppression pool. The level of the fuel remaining in the reactor pressure vessel is adjusted in this state, and new fuel is loaded thereafter.

When the regular inspection of the plant is completed, the water in the reactor well is treated in the filter demineralizer filter or other component of a wastewater treatment system or fuel pool decontaminate system and is returned to the condensation storage tank or pressure suppression pool. These operations constitute a critical path for the steps involved in the regular inspection of a plant, and hence contribute to an increase in the number of regular inspection steps and operating steps. In addition, some of the methods for handling and managing spent fuel during its exchange and storage in spent fuel storage pools have potential problems in terms of nuclear nonproliferation.

In conventional practice, a boiling-water reactor core is configured such that a plurality of fuel assemblies, themselves obtained by arranging fuel rods and water rods in square lattices, are arranged in a square lattice at a certain pitch, and the blades of each cross-sectional cruciform control rod (cross shaped control blade in a cross section) are inserted from below into four adjacent spaces formed by the fuel assemblies facing each other. The width of a fuel assembly is about ½ foot (15.24 cm), and the width of each blade on the cruciform control rod is about 12 cm. In other words, a value of about 0.051 $cm^{-1}$ is selected for the ratio (B/S) of the width (B) of each blade on a cruciform control rod (blade) and the surface area (S) of the fuel lattice defined by the surface area (S=A×A) of a square whose side is equal to the pitch (A) between the fuel assemblies.

In the conventional boiling-water reactor provided with fuel assemblies and cruciform control rods (blades) of this size, about 150 cruciform control rods (blades) are used per the reactor core per 1,000,000 kW of electric output, and some of the control rods are commonly used to reduce any excess reactivity of the nuclear reactor during operation.

Control rods (also called "control cells") surrounded by substantially burnt-up and comparatively unreactive fuel assemblies are often used as the control rods thus introduced, and no more than about 20% of all control rods are used to adjust reactivity during operation in this case.

Excess reactivity of the conventional nuclear reactors is set at all times to about 1% Δk or more, and commonly about 2% Δk, in order to be able to continue uninterrupted operation in cases in which various variations occur during operation, plan changes are introduced, errors are made during analysis, or the like, and excess reactivity is suppressed by using the control rods as control cells during an operating cycle lasting about 1 year.

The reactivity of the boiling-water reactor is adjusted not only by techniques involving the use of the aforementioned control rods but also by techniques in which the flow rate of the reactor core is controlled by forced circulation. When the flow rate of the reactor core is controlled, the void coefficient of the reactor can be reduced or increased by increasing or reducing the flow rate of the reactor core in a corresponding manner, making it possible to increase or decrease the reactor core reactivity and to achieve finer reactivity adjustments in comparison with the use of control rods. Adjusting the flow rate of the reactor core in this manner results in a control operation in which the flow rate is subjected to a spectral shift. Therefore a flow control system is adopted as a control operating system, the circulation flow rate is reduced and the absolute value of void coefficient increased in the first half of the operating period, and the flow rate of the reactor core is increased and the void coefficient reduced thereafter.

This control operating system has the effect of suppressing reactivity by hardening the neutron energy spectrum in the first half of the operating cycle, and of enhancing neutron absorption for uranium 238 and converting the uranium 238 into plutonium. Softening the neutron energy spectrum in the second half of the operating period allows converted plutonium to function as an effective fissionable material and produces enhanced reactivity, with the result that lower uranium enrichment can be adopted for uranium 235. However, a spectral shift control operation based on the flow control is characterized in that the fuel rod of the reactor core can be adjusted within a limited range, as can the void coefficient, making it impossible to achieve markedly different void coefficients in the first and second halves of an actual operating period.

With a burnable poison, the negative reactivity worth decreases (reactivity of fuel assemblies increases) in the course of burning, and the reactivity of fuel assemblies is decreased by the reduction in fissionable materials at the burnup (burnout rate) achieved after the burnable poison has been consumed, so the variations in excess reactivity due to the burnup can, on average, be minimized for a conventional boiling-water reactor by designing it such that poison reactivity decreases exactly to zero after each operating cycle.

In addition, the concentration of a burnable poison should be adjusted depending on the burnup corresponding to a length of operating period in order to adjust the reactivity of the burnable poison. Specifically, uranium oxide and other fissionable materials (commonly ceramics) are used as a base material of burnable poisons, and uniform stabilized products thereof (so-called solid solutions) are needed for the structural stability of burnable poison pellets. Consequently, the concentration of a burnable poison cannot be raised above a certain level, and conventional boiling-water reactors are operated using burnable poisons whose concentration falls within a certain range.

Natural gadolinium has been used as a burnable poison. In addition, the control rods are made of a neutron-absorbing material, which can be obtained using boron carbide ($B_4C$) or hafnium (Hf). Control rods made with Hf have a lower (in terms of absolute value) control rod worth (negative reactivity) in comparison with $B_4C$, so Hf cannot be used for the entire control rod in order to achieve the same control performance as that displayed by $B_4C$, making it necessary to adopt structures in which the ratio to water (moderator) is increased and, for example, two thin Hf sheets (thickness: about 1 mm) are combined.

There exist several needs for improving nuclear plant availability factor, economic efficiency, reduction of maintenance and improving durability. It is, however, impossible to achieve these goals with the aid of the conventional structures described above.

Because the blades of each control rod have small width per fuel assembly volume, the reactor core does not have sufficient control rod worth power operation. For this reason, the required large reduction in excess reactivity cannot be achieved despite the establishment of a much longer operating period.

Another feature of conventional fuel assembly composed of uranium fuel alone in care of long operating period is lack of reactivity at the beginning of exposure, and this reduction cannot be achieved with a burnable poison alone.

Uranium oxide or plutonium oxide is used as the nuclear fuel in the conventional boiling-water reactor, and an attempt to markedly extend the operating period without a significant increase in fuel density results in an excessively high burnup and imposes limitations on the operating period due to the corrosion of cladding of the fuel rods and the like.

Another requirement is that excess reactivity be increased in order to markedly extend the operating period, but it is impossible to establish adequate excess reactivity by conventional boiling water reactor, because their control rods have limited control capabilities.

When the boiling-water reactor is operated according to a spectral shift control operation method, its reactivity can be adjusted solely by varying the core flow of the reactor core, so the cooling capacity of the fuel assemblies is reduced when the reactor is operated at a low flow rate.

In addition, because the isotopes that have small absorbing capability are included in natural gadolinia, it is necessary to increase gadolinium concentration above the required level and creating problems in terms of mechanical stability for gadolinium-containing fuel pellets.

SUMMARY OF THE INVENTION

A primary object of the present invention is to provide a reactor core and a method for operating nuclear reactor that allows a nuclear plant to continuously operate for a long term period, such as 15 years or longer, without requiring a fuel exchange.

An another object of the present invention is to provide a reactor core and a method for operating nuclear reactor, making it possible to reduce the duration and number of maintenance procedures involved in the regular inspections of the nuclear plant.

Still another object of the present invention is to provide a reactor core and a method for operating nuclear reactor that are able to contribute to improved nuclear plant availability and economic efficiency, and to prevent nuclear proliferation from spreading.

The inventors conducted an extensive study into fuels and control rods (blades) in order to extend the continuous operation of a nuclear reactor to long term period, such as 15 years or longer. As a result, it was found that excess reactivity can be efficiently reduced by increasing the control rod worth, making the required improvements to the composition of the nuclear fuels and control rods, and adopting other measures, and a technique capable of attaining the above-described objects were discovered.

Specifically, the invention set forth in claim 1 provides a reactor core is mounted on a lower portion in a reactor pressure vessel comprising; a core support plate is mounted on an lower portion in said reactor pressure vessel; an upper grid is sat on above said core support plate; a plurality of fuel assemblies which are supported by said core support plate and said upper grid, are arranged in a square grid at a certain pitch; and a plurality of cross-sectional cruciform control rods having each four blades thereof, are inserted into four adjacent spaces formed by said four fuel assemblies facing each other, wherein said reactor core is used to set a numeric value of 0.06 cm$^{-1}$ or greater which is selected for the ratio (B/S) of a width (B) of each blade on said control rods and a surface area (S) of each fuel lattice defined by said surface area (S) of a square whose side is equal to the pitch between said fuel assemblies.

Here, the ratio B/S is a numeric value corresponding to the blade width (B) of a control rod (blade) and the surface area (S) of the fuel lattice defined the surface area of a square whose side is equal to the pitch between the fuel assemblies. This numeric value (B/S) is roughly proportional to the magnitude of the control rod worth. According to the present invention, the control rod worth is markedly increased by raising the B/S value to 0.06 cm$^{-1}$ or greater (as opposed to about 0.05 cm$^{-1}$ in a conventional type of the nuclear reactor). Excess reactivity can therefore be adequately reduced even in nuclear reactors in which substantial excess reactivity is required, such as when an attempt is made to markedly extend the operating period (for example, to allow a reactor to continuously operate for 15 years and longer).

According to the present invention, the B/S value should preferably be between 0.065 cm$^{-1}$ and 0.08 cm$^{-1}$. Raising the B/S value above 0.065 cm$^{-1}$ allows the plant to be able to continuously operate for 20 years, whereas setting this B/S value to 0.075 cm$^{-1}$ extends such continuous operation to over 20 years. The upper limit of the B/S value is set to 0.08 cm$^{-1}$ because exceeding this limit makes it impossible to make the control rods (blades), such as moving structures, any larger and results in reduced fluidity or the like.

According to a specific example of the invention set forth in claim 2, a reactor core as claimed in claim 1, wherein said fuel assemblies are arranged fuel rods and said fuel rods contain uranium, plutonium, or oxides or nitrides of the two elements as the nuclear fuel material.

In particular, the fuel material in the form of uranium, plutonium, or a nitride thereof is denser than fuel in the form of an oxide of nuclear fuels, so the reactivity per unit weight of fuel material can be reduced at the same amount of energy generated by each fuel assembly, and the nuclear fuel can thus be made safer in terms of cladding corrosion.

The invention set forth in claim 3 provides a reactor core is claimed in claim 2, wherein said fuel rods disposed around said fuel assemblies contain thorium as the nuclear fuel material.

Placing thorium in peripheral portions of each fuel assembly allows reactions in which the thorium absorbs neutrons and converts to uranium 233. Reactivity can thus be reduced at the beginning of the cycle and increased in the second half thereof, making it possible to reduce the extent to which reactivity is adjusted by the burnable poison. As a result, more nuclear fuel material can be loaded by reducing the amount of gadolinia, and corrosion can be reduced because a lower burnup can be achieved while the amount in which energy is generated can remain the same.

The invention set forth in claim 4 provides a reactor core as claimed in claim 1, wherein said fuel assemblies have some fuel rods in which a burnable poison is added, and a concentration of said burnable poison is adjusted to a level at which a reactivity of said burnable poison is substantially zero when said fuel assemblies are taken out.

The burnable poison can thus be added in a lesser amount, and higher burnout efficiency (burnup fraction) can be obtained.

The invention set forth in claim 5 provides a reactor core as claimed in claim 4, wherein said burnable poison is a gadolinia product containing pure particles or grains of $Gd_2O_3$ with a diameter of no less than 50 microns and no more than 200 microns, said gadolinia particles or grains are dispersed throughout the nuclear fuel material, and the weight ratio of gadolinia particles or grains to fuel rods is 15 wt % or greater.

The invention set forth in claim 6 provides a reactor core as claimed in claim 4, wherein said burnable poison is a gadolinia product, and combined enrichment of gadolinium isotopes with odd mass numbers in said gadolinia product is greater than the enrichment of natural gadolinium.

Gd 155 and Gd 157 provide larger absorption capability than do naturally occurring isotopes with even mass numbers, and are therefore used in enriched form. An enrichment of up to 60% is preferred in this case. Enriched gadolinium can be obtained by the atomic laser process. Gadolinium should preferably be used in the form of gadolinium oxide (gadolinia), and the concentration of gadolinia in the nuclear fuel (weight ratio of gadolinia in the nuclear fuel) should preferably be 15 wt % or greater. The gadolinia is obtained by a process in which pure gadolinia is processed into granular form, uniformly dispersed in a nuclear fuel material, and sintered as pellets. The diameter of the particulate gadolinia should preferably be distributed across a range of 50 to 200 microns, and the mean diameter should preferably be about 100 microns.

The invention set forth in claim 7 provides a reactor core as claimed in claim 1, wherein fuel assembly has a plurality of fuel rods changed with a fissionable material thereinto, and the mean enrichment of said fissionable material is the same for all loaded fuel assemblies.

The invention set forth in claim 8 provides a reactor core as claimed in claim 1, wherein fuel assembly has a plurality of fuel rods charged with a fissionable material thereinto, and the fissionable material concentration of said fuel assemblies is high in the lower portions of said fuel assemblies and low in the upper portions thereof, and the difference in enrichment between the lower and upper portions is 0.3 wt % or greater.

The invention set forth in claim 9 provides a reactor core as claimed in claim 1, wherein said cruciform control rods are inserted from above in said reactor pressure vessel.

Considerable thermal power and a lower peak can thus be achieved by markedly raising the enrichment of the lower portion of each fuel assembly above the enrichment of the upper portion thereof, and the average void coefficient of the reactor core can be raised to 50% or greater at the beginning of cycle by employing control rods (blades) insertable from above in the reactor pressure vessel.

The invention set forth in claim 10 provides a reactor core as claimed in claim 1, wherein said effective blade portions of said cruciform control rods are entirely composed of hafnium whose thickness is 0.8 cm or greater.

Nuclear life can thus be extended from about 5 years for a conventional reactor to 20 years or more for the nuclear reactor of the present invention by the use of Hf plates whose thickness is much greater than the thickness (about 1 mm) of conventional Hf plates used as control rods.

The invention set forth in claim 11 provides a method for operating a nuclear reactor, comprising the steps of; mounting a reactor core on a lower portion in a reactor pressure vessel; arranging a plurality of fuel assemblies in said reactor core in a square grid at a certain pitch; inserting a plurality of cross-sectional cruciform control rods into four adjacent spaces formed by said four fuel assemblies facing each other; setting a numeric value of 0.06 $cm^{-1}$ or greater which is selected for a ratio (B/S) of a width (B) of each blade on said control rods and a surface area (S) of a fuel lattice defined by a surface are square whose side is equal to a pitch between said fuel assemblies; and operating at an excess reactivity of no less than 5% $\Delta k$ and no more than 10% $\Delta k$.

According to the method of the present invention, excess reactivity can be adequately adjusted (even when the operating period is markedly increased) with the aid of control rods as a result of the fact that the excess reactivity is set much higher than in the past, that is, between 5% $\Delta k$ and 10% $\Delta k$.

The invention set forth in claim 12 provides a method for operating a nuclear reactor, as claimed in claim 11, wherein operating effected that the maximum value of a core-averaged void coefficient observed during power operation of said nuclear reactor is generated at a time other than the end of an operating cycle, the minimum value of said core-averaged void coefficient is generated at the end of the operating cycle, and the difference between the minimum and maximum values of the core-averaged void coefficient is kept at 20% or greater.

The invention set forth in claim 13 provides a method for operating a nuclear reactor, as claimed in claim 11 or 12, wherein said reactor core is operated with the control rods inserted into said reactor core by 30% or greater of axial length of said control rods.

Thus, a boiling-water reactor in which uranium, plutonium, or both are used as nuclear fuel materials can be operated at a wide spectral shift control operation unattainable in the past as a result of the fact that the maximum value of a core-averaged void coefficient observed during output operation is generated at a time other than the end period of the operating cycle, the minimum value of the core-averaged void coefficient is generated at the end period of the operating cycle, and the difference between the minimum and maximum values of the core-averaged void coefficient has been kept at 20% or greater.

BRIEF DESCRIPTION OF THE DRAWINGS

In the accompanying drawings.

DESCRIPTION OF THE PREFERRED EMBODIMENTS

Embodiments of the present invention will now be described with reference to the accompanying figures.

Figure 1:
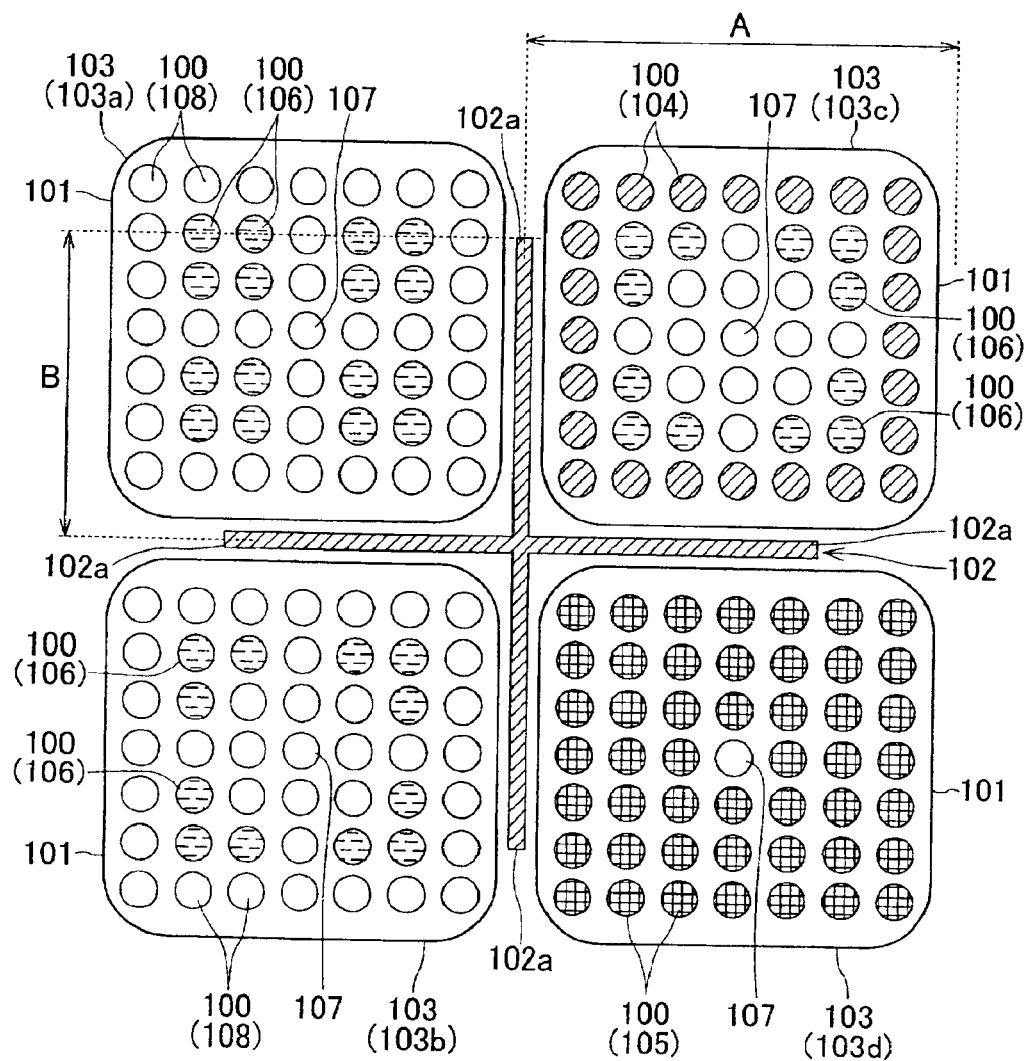
FIG. 1 is a plate cross-sectional view showing fuel assemblies and cross-sectional cruciform control rods based on an embodiment of the reactor core according to the present invention.

FIG. 1 is an enlarged plate cross-sectional view of fuel assemblies and control rods designed to illustrate the structure of a reactor core. FIG. 1 shows a case in which four different types of fuel assemblies are loaded at the same locations in the reactor core, but this arrangement is shown solely for the sake of convenience, and in actual conditions the fuel assemblies can be appropriately combined and loaded in accordance with their position inside the core.

Figure 2:
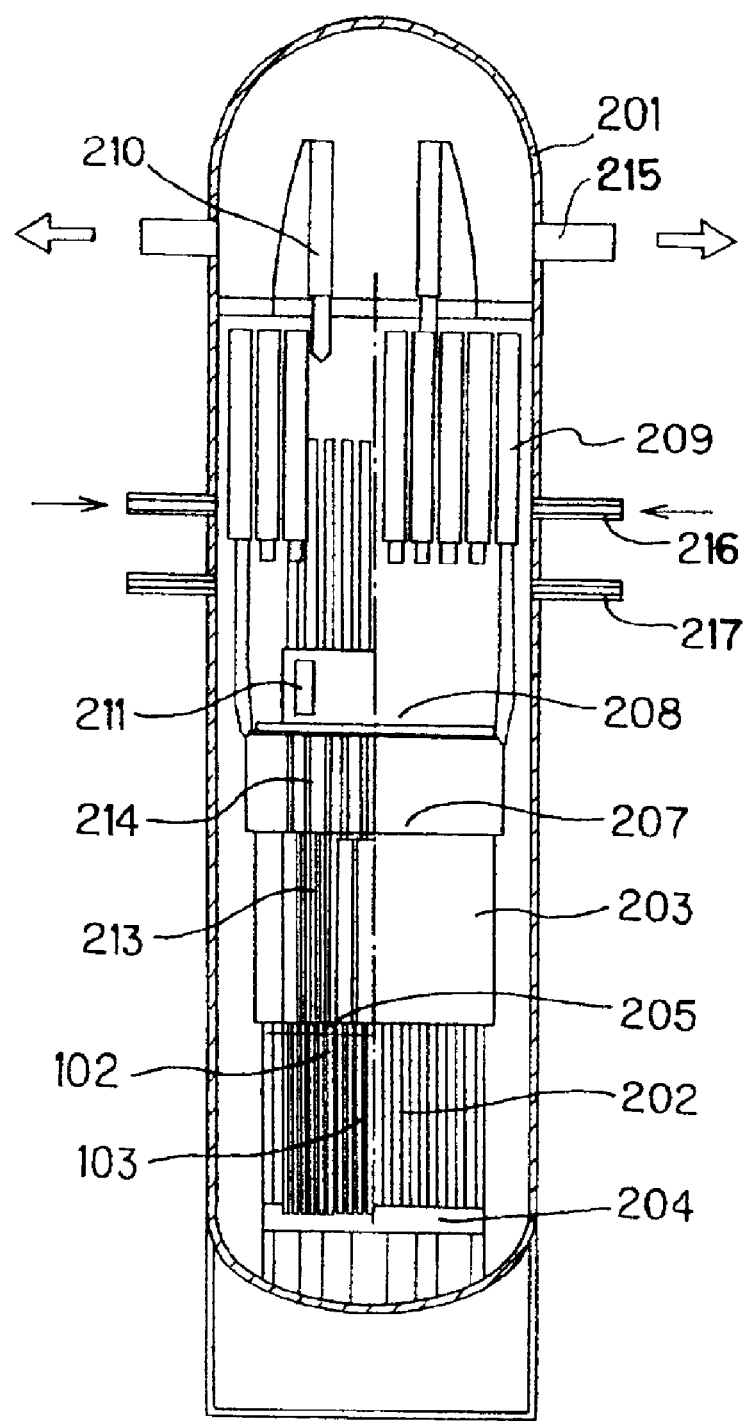
FIG. 2 is a longitudinal cross-sectional view showing a reactor pressure vessel provided with the core shown in FIG. 1.
Figure 3:
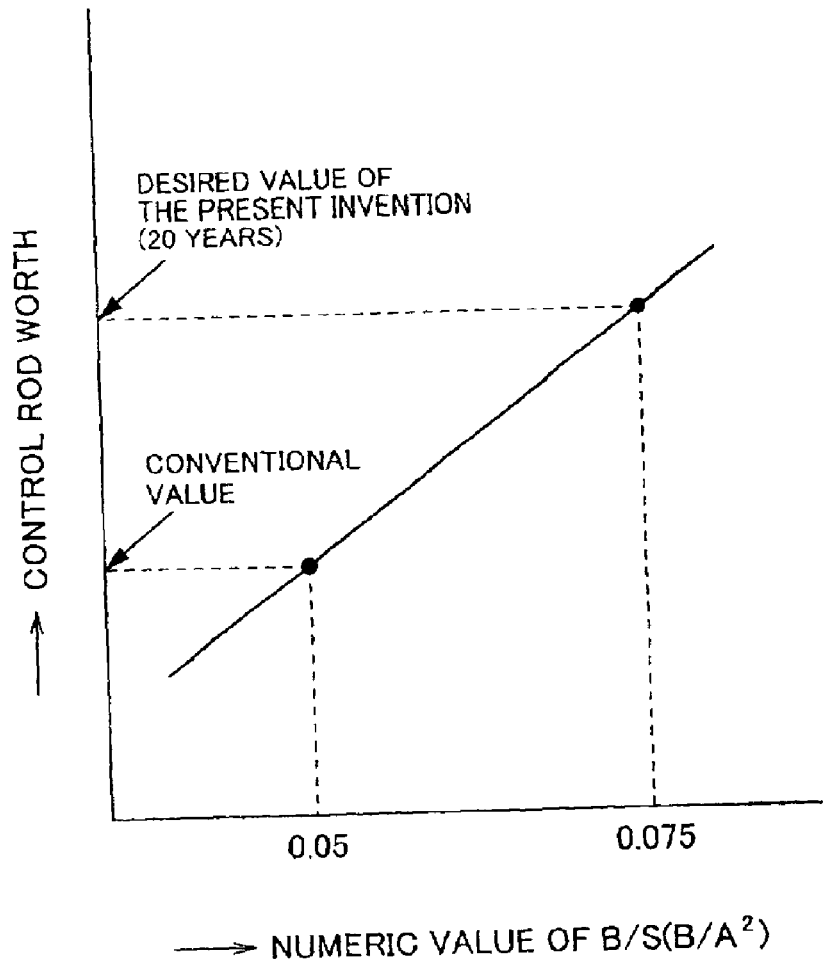
FIG. 3 is a diagram illustrating a relational expression between a control rod worth and a numeric value B/S of the present invention.

FIG. 2 is a longitudinal schematic cross-sectional view showing the structure of a reactor pressure vessel for a boiling-water reactor in which the above-described core is used. FIG. 3 is a diagram illustrating the operation of the present invention.

The structure of the reactor pressure vessel 201 for the boiling-water reactor as a light water reactor configured in accordance with the present embodiment will first be described with reference to FIG. 2.

The reactor pressure vessel 201 is used a used natural-circulation, nuclear reactor provided with a built-in upper control rod drive mechanisms 211. The reactor core 202 is disposed in the lower or bottom portion inside the reactor pressure vessel 201 of a boiling water reactor and the core 202 is obtained by a core support plate 204 and an upper grid 205 which support the fuel assemblies 103 and control rods 102 for forming a square grid. The fuel assemblies 103 are supported by a core support plate 204 and an upper grid 205. The upper grid 205 is sat on above the core support plate 204 which is mounted on an lower or bottom portion in the reactor pressure vessel 201.

The core 202 is applied to the natural-circulation nuclear reactor in which a coolant is allowed to circulate naturally without the use of a recirculation pump by utilizing the chimney effect of the enhanced natural circulation produced by the presence of a core shroud 203 and a shroud head 207.

Specifically, control rod drive mechanisms 211 are mounted on a control rod drive mechanism housing 208, which is itself mounted on the shroud head 207. In this arrangement, cross-sectional cruciform control rods (cross-shaped control blades in a cross section) 102 can be pulled up from inside the core 202 by control rod drive shafts 214, accompanied by the movement of an aqueous single-phase flow region composed of the core shroud 203 and a plurality of control rod guide tubes 213.

A vapor-liquid (water) two-phase flow created inside the reactor core 202 rises through the two-phase flow region around the control rod guide tubes 213 and produces a strong natural circulating force. This is because the reactor core 202 is disposed in the lower or bottom portion inside the reactor pressure vessel 201, and the control rod guide tubes 213 are disposed in the top portion.

As can be seen in FIG. 2, in the present embodiment, the area of the reactor pressure vessel 201 underneath the core 202 does not contain nozzles or other line connection components. The main lines connected to the reactor pressure vessel 201 include the main steam pipes 215, water supply lines 216, emergency core cooling lines 217, and the like, all of which are disposed above the reactor core 202. In FIG. 2, a steam separator 209 is disposed upper the control rod drive housing 208, and a steam dryer 210 is disposed above the steam separators 209.

The control rod (blade) drive mechanism 211 is thus placed above the core 202 in the reactor pressure vessel 201, and a natural circulation system is adopted, dispensing with the need for the numerous nozzles commonly required for the mounting of the control rod drive mechanisms disposed on the bottom portion of a conventional boiling-water reactor, or for the nozzles passing through each main shaft of the nuclear internal recirculation pumps. It is thus possible to minimize the volume of the space underneath the dry well around the reactor pressure vessel 201 and to facilitate the supply of water into this narrow space in the dry well, making it easier to achieve IVR (in-vessel retention) for the core melt components as a means of preventing serious accidents from spreading.

The arrangement structure of the fuel assemblies 103 will now be described with reference to FIG. 1, as shown in the horizontal cross section, dimensions, and other parameters of the cruciform control rods (blades).

The fuel assemblies 103 of the present embodiment are obtained by arranging a plurality of fuel rods 100 and one or two water rods 107 in 7×7 square lattices in a regular fashion, and enclosing each fuel bundle of the fuel rods 100 and the water rods 107 in a rectangular tubular shaped channel box 101. Many of the fuel assemblies 103 are themselves arranged in a square grid inside the reactor pressure vessel 201 at a certain or constant pitch. Each blade 102a of the cruciform control rods 102 is respectively inserted into one of the four adjacent spaces formed by four fuel assemblies facing each other, completing the reactor core 202.

In this embodiment, a numeric value of 0.06 cm$^{-1}$ or greater is selected for the ratio (B/S) of the width (B) of each blade 102a of the cruciform control rods 102 and the surface area (S=A×A) of the fuel lattice, which is given as the surface area of a square whose side is equal to the array pitch (A) of the fuel assemblies 103.

Specifically, A and B may, for example, be 10.8 cm and 8.7 cm, respectively, assuming that the fuel assemblies 103 are arranged at a fuel assembly pitch A (cm) and that the blade width of each cruciform control rods 102 is B (cm). In this case, the B/(A×A) value (that is, B/S) will be about 0.075 cm$^{-1}$, which is greater than the conventional B/S value (about 0.05 cm$^{-1}$).

The fuel rods(pins) 100 of the fuel assemblies 103 contain uranium, plutonium, or oxides or nitrides of the two elements as the nuclear fuel material. A plurality of fuel rods 106 containing burnable poison are arranged close to each other in the fuel assemblies 103.

The fuel rods 100 will now be described. The fuel rods 100 of the fuel assemblies 103a and 103b in the upper left and lower left areas (sections) of the cruciform control rod 102 in FIG. 1 have oxide pellet fuel rods 108 and burnable poison fuel rods 106. The oxide pellet fuel rods 108 are obtained by filling cladding with uranium oxide fuel pellets, and the fuel rods 106 with burnable poison are obtained by filling fuel cladding with pellets composed of uranium oxide to which gadolinia has been added as burnable poison. The gadolinia fuel rods 106 are disposed inside the fuel assemblies 103a, 103b and 103c. For example, the fuel assembly is arranged such that four rods 106 are disposed in each quadrant in the cross section of the fuel assembly 103a in the case of the fuel assembly 103a in the upper left corner in FIG. 1, and three rods 106 are disposed in each quadrant in the cross section of each fuel assembly 103b and 103c in the case of the fuel assembly 103b and 103c in the lower left corner and the upper right corner, respectively, in FIG. 1.

The gadolinium isotopes of the gadolinia fuel rods 106 are obtained by a method in which Gd 157, which is an isotope with an odd-numbered mass number, is enriched by the laser isotope separation process to a concentration (such as 60 wt %) greater than that of natural gadolinium. The gadolinia is first made or formed fashioned into pure particulate $Gd_2O_3$, uniformly dispersed in nuclear fuel material, pelletized, and sintered. The particulate gadolinia is substantially spherical, the diameters thereof are distributed across a range of about 50 to 200 microns($\mu$m), and the mean diameter is set to about 100 microns($\mu$m). The gadolinia concentration of the fuel pellets (the weight percentage of gadolinia in the fuel pellets), that is, the weight percentage of $Gd_2O_3$ particles in the fuel rods, is kept at or above 15 wt %.

Particulate gadolinia whose diameters range from 50 to 200 microns is dispersed in the nuclear fuel material, allowing the nuclear fuel material (which has better heat conduction than does gadolinia) to function as a heat conductor for the gadolinia fuel rods and makes it possible to achieve better heat conduction than that provided by a solid solution of gadolinia and nuclear fuel material. When the diameter of particulate gadolinia exceeds 200 microns, it is more difficult to uniformly disperse the particulate gadolinia in the nuclear fuel material, and when the diameter of particulate gadolinia falls below 50 microns, the product resembles a solid solution of mixed gadolinia and nuclear fuel material, and the heat conduction decreases and approaches that of a solid solution.

In the fuel assembly 103c in the upper right corner of FIG. 1, the fuel rods 100 disposed along the periphery are thorium-containing fuel rods 104 containing thorium oxide as a nuclear fuel material. Specifically, the fuel assembly 103c is configured such that thorium-containing fuel rods 104 are the only fuel rods 100 disposed adjacent to the channel box 101, and these fuel rods 104 are free of uranium or plutonium.

Reactions in which thorium absorbs neutrons and converts to uranium 233 can be promoted by placing thorium-containing fuel rods 104 on a peripheral portion of the fuel assembly 103c. Reactivity can thus be suppressed at the start of burning and increased in the second half of the burning cycle, and the extent to which reactivity must be adjusted by burnable poison can be reduced.

As a result, gadolinia content can be reduced and more nuclear fuel material can be loaded, making it possible to reduce the burnup of each fuel rod 100 and to diminish the undesirable corrosion, assuming that each fuel assembly 103 generates the same amount of energy. The same applies to fuel rods 100 other than the thorium-containing fuel rods 104, as can be seen, for example, in the lower left corner of FIG. 1.

The fuel assembly 103d shown in the lower right corner of FIG. 1 is configured such that fuel rods 105 containing nitride pellets are used instead of the fuel rods containing oxide pellets. Some of the fuel rods 105 containing nitride pellets be added contain gadolinia in the same manner as above, and can thus operate as fuel rods containing burnable poison.

A nuclear fuel material in the form of a nitride has greater density than does a nuclear fuel material in the form of an oxide, and more nuclear fuel material can be included per unit of volume. Increasing the content of nuclear fuel material per unit of volume will lower the ratio of the amount of burnt nuclear fuel material to the amount in which the nuclear fuel material is contained in the fuel rods at the same energy level, ultimately making it possible to reduce the burnup of each fuel rod.

Thus, using uranium, plutonium, or a nitride thereof as the fuel material allows the density of fissionable material to be increased in comparison with fuel rods obtained using an oxide in the case of the fuel rods 105 containing nitride pellets in accordance with the present embodiment, making it possible to reduce the burnup rate of each fuel rod while generating the same amount of energy per fuel assembly, and thus to obtain fuel with improved stability against the corrosion of cladding.

The burnable poison concentration of the fuel assemblies 103 having the aforementioned fuel rods 100 is adjusted such that the reactivity of the burnable poison is reduced substantially to zero when the burnt fuel is taken out, and the mean concentration of fissionable material is kept at the same level for all loaded fuel assemblies 103. In addition, the fissionable material concentration of the fuel assemblies 103 is high in the lower portions of the fuel assemblies 103 and low in the upper portions, and the difference in enrichment of the fissionable material between the lower and upper portions is set to 0.3 wt % or greater. For example, the uranium enrichment of the fuel assemblies 103 is distributed in the vertical direction such that the enrichment of the lower portions is greater about 0.3 wt % than the enrichment of the lower portions, with the border between the upper and upper portions passing through the middle of the effective portion of each fuel assembly.

The mean concentration of the fissionable material is set to the same level for all the fuel assemblies loaded into the core. Because the nuclear reactor can operate continuously for a long-term period, such as 15 years or longer, there is no need to plan for the same fuel exchange as in the past and to load a plurality of types of fuel assemblies that differ from each other in terms of the mean enrichment of the fissionable material. Complex manufacturing steps for producting the fuel assemblies therefore be dispensed with.

A neutron-absorbing material is incorporated into the control rods (blades) 102, producing Hf-containing control rods (blades). The thickness of the Hf plates for these control rods is set to several millimeters, such as 8 mm, which corresponds to about half the gap between two fuel assemblies 103. In conventional practice, control rods are limited in terms of weight because they need to be rapidly inserted during a reactor scram, and thick plates cannot be used because Hf itself has some large weight. In the present invention, a thickness of 8 mm of the Hf plates can be achieved by setting the (B/S) value to 0.06 $cm^{-1}$ or greater and inserting the control rod from the top.

The present embodiment thus allows the nuclear life to be increased from about 5 years for conventional control rods to 20 years or longer by adopting a structure in which the control rods (blades) 102 are obtained using much thicker Hf plates in comparison with Hf plates of the conventional control rods (blades) sheets, whose thickness is about 1 mm.

Operation will now be described and explained.

Control rod worth was set relative to the desired number of years of usage in accordance with the present embodiment, as shown in FIG. 3. According to the present embodiment, the control rod worth can be increased from the conventional B/(A×A) value of 0.05 $cm^{-1}$ to 0.075 $cm^{-1}$ (an increase of 50%). Consequently, excess reactivity can be suppressed even when it is considerable, such as when a much longer operating period is needed (for example, when continuous operation for 20 years or longer is needed).

During operation of the nuclear plant, the control rods 102 are moved downwardly by the built-in control rod drive mechanism 211 from the upper portion inside the reactor pressure vessel 201, and these control rods 102 are inserted substantially midway into the fuel assemblies 103, as shown in FIG. 2. The axial power shape of the core has a peak in the lower portion thereof, with the axical peaking value reaching 1.6 or greater. The control rods 102 are inserted by 30% or greater at the start of operation in order to suppress excess reactivity in an adequate manner. The excess reactivity is at its maximum at the start of operation, ranging from 5% Δk to 10% Δk, and gradually decreases as the operation progresses.

As described above, the present embodiment is configured such that the fissionable material concentration of the fuel assemblies 103 is high in the lower portions of the fuel assemblies and low in the upper portions thereof, and the difference in enrichment between the lower and upper portions of the fuel assemblies 103 is 0.3 wt % or greater. Since the control rods 102 are inserted into the reactor core 202 from above thereof, the power shape has a peak in the lower portions, and a higher void coefficient is established in the lower portions of the fuel assemblies. In the process, the void coefficient of the upper portions is affected by the void coefficient of the lower portions, so the presence of the peak in the lower portions prevents the void coefficient of the upper portions from diminishing. The core-averaged void coefficient can therefore be increased by keeping the output at its peak in the lower portions, allowing the core-averaged void coefficient to be kept at 50% or greater at the beginning of cycle. The minimum core-averaged void coefficient observed in the second half of the operating cycle is 30% or less, constituting a difference of 20% or greater in terms of the core-averaged void coefficient and representing a marked spectral shift control operation unattainable with the existing technology.

The present embodiment therefore allows continuous operation to be carried out without the periodic fuel exchange in the reactor core after the initial loading, and can, for example, provide an arrangement in which all of the fuel assemblies are exchanged in a single batch after 20 years of operation.

Another feature of the present embodiment is that using nitride pellet fuel rods 105 makes it possible to reduce the burnup of each fuel rod while generating the same energy per fuel assembly 103, and to improve stability against the corrosion of cladding.

Reactions in which thorium absorbs neutrons and converts to uranium 233 can be promoted by placing thorium-containing fuel rods 104 on the peripheral portions of the fuel assemblies 103. Reactivity can thus be suppressed at the start of burning and increased in the second half of the burning cycle. The extent to which reactivity must be adjusted by burnable poison can therefore be reduced, and, as a result, the amount of gadolinia can be reduced, the nuclear fuel material can be loaded in a greater amount, and the burnup per unit of fuel can be reduced even when the fuel assemblies 103 generate the same amount of energy. The corrosion of cladding can be further reduced by these factors.

On the other hand, another feature of the present embodiment is that adequate adjustments can be made using control rods 102 by keeping excess reactivity between 5% and 10%, even with a much longer operating period.

Nuclear life, limited to about 5 years in conventional control rods, can be increased to 20 years or longer because the control rods 102 of the present embodiment can be obtained using much thicker Hf plates than that in the past.

Structurally, the nuclear reactor of the present embodiment has twice as many control rods as conventional reactor with fuel of the same volume. The result is that when some of the control rods have inadequate nuclear life, considerable latitude is still offered in terms of the use of alternative control rods, and this feature also allows optimal control rod worth to be maintained in a reactor core capable operating for a much longer period of time.

Although the present embodiment was described with reference to fuel assemblies arranged as a 7×7 matrix, the present invention is not limited to this option alone and allows other arrangements (such as 8×8 or 6×6) to be provided and adjusted by changing the diameters of the fuel rods. Furthermore, the present embodiment was described on the assumption that the size of the fuel assemblies was about 0.7 times the size of conventional fuel assemblies, but larger assemblies may also be adopted as long as the requirements related to the B/(A×A) standard are satisfied.

According to the present invention, it is possible to construct a reactor core capable of continuously operating for a long term period, for example 15 years or longer, without fuel exchange. It is therefore possible to markedly improve plant availability and economic efficiency by reducing the number and duration of maintenance steps involved in regular plant inspections, to construct systems in which fuel can be changed together with the reactor pressure vessel after the operation is completed, and to build an effective plant in terms of nuclear nonproliferation.

What is claimed is:

1. A reactor core capable of being mounted in a lower portion of a reactor pressure vessel comprising a core support plate mounted on the lower portion in the reactor pressure vessel and an upper grid disposed on and above the core support plate, said reactor core comprising:
   a plurality of fuel assemblies configured to be supported by the core support plate and the upper grid so as to be arranged in a square grid form at a certain pitch; and
   a plurality of control rods having a cruciform cross-section comprising four blades each having a width (B), each of said control rods being adapted for insertion into four adjacent spaces between four fuel assemblies facing each other, wherein a ratio (B/S) of the width (B) of the control rod blades to a surface area (S) of a square having sides each being equal to the pitch between the fuel assemblies is set in a range of 0.065 to 0.08 $cm^{-1}$.

2. A reactor core as claimed in claim 1, wherein said fuel assemblies comprise fuel rods and said fuel rods contain uranium, plutonium, or oxides or nitrides of the two elements as nuclear fuel material.

3. A reactor core as claimed in claim 2, wherein fuel rods disposed around said fuel assemblies contain thorium as the nuclear fuel material.

4. A reactor core as claimed in claim 1, wherein a fuel assembly has a plurality of fuel rods charged with a fissionable material thereinto, and a mean enrichment of said fissionable material is the same for all loaded fuel assemblies.

* * * * *